United States Patent [19]

Oyaizu et al.

[11] 4,327,204

[45] Apr. 27, 1982

[54] PROCESS FOR PRODUCING POLYURETHANE ELASTOMER BY MIXING A HARDENER COMPOSITION WITH AN ISOCYANATE COMPOSITION

[75] Inventors: Yoshijiro Oyaizu, Yaizu; Wataro Koike, Shizuoka; Chihiro Yazawa, Yokohama, all of Japan

[73] Assignee: Ihara Chemical Industry Co., Ltd., Tokyo, Japan

[21] Appl. No.: 131,555

[22] Filed: Mar. 18, 1980

[30] Foreign Application Priority Data

Apr. 11, 1979 [JP] Japan .................................. 54-43000

[51] Int. Cl.[3] .............................................. C08G 18/10

[52] U.S. Cl. ........................................ 528/61; 528/63; 528/64

[58] Field of Search .............................. 528/61, 63, 64

[56] References Cited

U.S. PATENT DOCUMENTS 3,718,624 2/1973 Rustad .................................. 528/63

FOREIGN PATENT DOCUMENTS 51-45316 12/1976 Japan .

OTHER PUBLICATIONS

Wyman, *Rubber World*, May, 1978, pp. 41–44.

*Primary Examiner*—Maurice J. Welsh

*Attorney, Agent, or Firm*—Oblon, Fisher, Spivak, McClelland & Maier

[57] ABSTRACT

A polyurethane elastomer is produced by mixing a hardener composition containing a polyamine, a long chain polyol having an average molecular weight of 300 to 4,000 and a catalyst with an isocyanate composition comprises a prepolymer having terminal isocyanate group and an average molecular weight of 500 to 5,000 and an organic diisocyanate monomer with or without a triisocyanate monomer and a ratio of isocyanate groups of said prepolymer to amino groups of said polyamine is in a range of 0.6:1 to 1.5:1 and a ratio of a total of isocyanate groups in said isocyanate composition to a sum of amino groups of said polyamine and hydroxyl group of said long chain polyol is in a range of 0.8:1 to 1.4:1.

9 Claims, No Drawings

PROCESS FOR PRODUCING POLYURETHANE ELASTOMER BY MIXING A HARDENER COMPOSITION WITH AN ISOCYANATE COMPOSITION

BACKGROUND OF THE INVENTION

1. Field of the Invention

The present invention relates to a process for producing a polyurethane elastomer having excellent physical properties by a two liquid mixing method at a lower temperature. More particularly, it relates to a process for producing a polyurethane elastomer having excellent physical properties by mixing at an ambient temperature and fast curing at a lower temperature by using a hardener composition containing a polyamine, a polyol and a catalyst and an isocyanate composition containing an organic diisocyanate monomer and an isocyanate prepolymer.

2. Description of the Prior Arts

Heretofore, polyurethane elastomers have excellent characteristics such as high strength, elasticity, wearing resistance and oil resistance, and accordingly polyurethane elastomers have been widely used for various fields such as parts for cars, parts for industrial instruments, and parts for sport goods.

As a process for producing polyurethane elastomers, it has been proposed and widely applied that a prepolymer having terminal isocyanate groups be prepared by reacting a long chain diol with an excess of an aromatic diisocyanate and deaerated by heating it at about 100° C. and admixing with a molten hardener such as an aromatic diamine, (such as 4,4'-methylenebis(2-chloroaniline) having a melting point of 95° C. referred to a MOCA which is usually used) heating at about 100° to 110° C. and curing at 100° C., as a hot-melt molding method by a prepolymer method.

Thus, the prepolymer method for the hot-melt molding method has many following disadvantages which should be resolved.

Firstly, the solid hardener (such as MOCA) should be heat-melted and the prepolymer should be heated so as to prevent a solidification of the hardener and to make easy the deaeration whereby the aromatic diamine and the aromatic diisocyanate in the prepolymer are disadvantageously vaporized. These compounds are toxic to humans. An operator may breathe in the fine dust or varporized gas of the aromatic diamine. In the present stage, said breathing has not been successfully prevented.

Secondly, the aromatic diamine is used after heat-melting whereby physical properties of the resulting polyurethane elastomer are deteriorated and a hue is remarkably changed by the heating to cause a lower value polyurethane elastomer goods. Moreover, the terminal isocyanate groups are activated by heating the prepolymer to react with urethane groups of the prepolymer. This causes the allophanate crosslinking to increase the viscosity and to deteriorate physical properties of the polyurethane elastomer.

Thirdly, it is difficult to maintain stable conditions for the process by the increase of the viscosity of the prepolymer as mentioned in the Second problem. Therefore, it is quite difficult to attain a mass production by an automatic continuous mixing method.

Fourthly, the mixing, the hardening and the curing are carried out at high temperature whereby a large quantity of heat energy is consumed to cause high cost for the preparation. These are disadvantages found in the conventional method.

Various studies for improving these problems have been presented. For example, a polyamine is dissolved in a solvent of polyethyleneglycol dibenzoate or polypropyleneglycol, and is mixed with a prepolymer having terminal isocyanate groups to harden the mixture at an ambient temperature. Thus, in accordance with this process, the solvent of polyethyleneglycol dibenzoate or polypropyleneglycol is not reactive to remain in the resulting polyurethane elastomer as a plasticizer whereby the physical properties of the urethane elastomer is disadvantageously lowered. It has been known to produce a polyurethane elastomer by the one shot method of reacting a long chain diol, an organic diisocyanate and a specific tetrahalogenated aromatic diamine in one step (Japanese Examined Patent Publication 45316/1976). In this process, the aromatic diamine is dissolved in the long chain diol, whereby there is no trouble concerning breathing of fine dust or vapor of the aromatic diamine. Moreover, a polyurethane elastomer having high hardeners and excellent physical properties can be advantageously produced. However, the specific halogenated aromatic diamine should be used as the hardener. This is serious problem.

The inventors have studied to develop the improved process for producing a polyurethane elastomer by overcoming the disadvantages and the problems found in the conventional processes.

SUMMARY OF THE INVENTION

It is an object of the present invention to provide a process for producing a polyurethane elastomer having excellent physical properties without a fine dust or vapor of a toxic aromatic diamine.

It is another object of the present invention to provide a process for producing a polyurethane elastomer having excellent physical properties especially high heat resistance and high hardness and strength by hardening at a lower temperature such as an ambient temperature as a cold mixing-cold fast hardening.

The foregoing and other objects of the present invention have been attained by using a hardener composition containing a polyamine, a long chain polyol, and a catalyst and an isocyanate composition containing diisocyanate monomer and a prepolymer having terminal isocyanate groups and mixing them at specific ratios of the isocyanate groups of the prepolymer having terminal isocyanate groups and the diisocyanate monomer, and the amino groups of the polyamine and the hydroxyl groups of the long chain polyol.

DETAILED DESCRIPTION OF THE PREFERRED EMBODIMENTS

The cold mixing-cold fast hardening is attained by the process of the present invention together with the improvements for satisfying the objects of the present invention.

In accordance with the process of the present invention, a polyurethane elastomer is produced by mixing a hardener composition containing a polyamine, a long chain polyol having an average molecular weight of 300 to 4,000 and a catalyst and an isocyanate composition wherein said isocyanate composition comprises a prepolymer having terminal isocyanate groups and an average molecular weight of 500 to 5,000 and an organic diisocyanate monomer and a ratio of the isocyanate groups of the prepolymer to the amino groups of the polyamine is in a range of 0.6:1 to 1.5:1 and a ratio of a total of isocyanate groups in the isocyanate composition to a sum of amino groups of the polyamine and hydroxyl groups of the long chain polyol is a range of 0.8:1 to 1.4:1.

The preferable polyamines used in the hardener composition are aromatic diamines which can have suitable substituents such as halogen atoms, alkyl, alkoxy, alkylthio, trifluoromethyl and alkoxycarbonyl groups on the aromatic ring.

Suitable aromatic diamines include benzidine such as 3,3'-dichlorobenzidine, 3,3'-dichloro-5,5'-dimethylbenzidine; diaminodiphenyl ether such as 4,4'-diamino-3,3'-dichlorodiphenyl ether; diaminodiphenyl disulfide such as 4,4'-diamino-3,3'-dichlorodiphenyl disulfide; 4,4'-methylenebisaniline such as 4.4'-methylenebisaniline, 4,4'-methylenebis(2-chloroaniline)(MOCA), 4,4'-methylenebis(2-ethylaniline), 4,4'-methylenebis(2-methoxyaniline), 4,4'-methylenebis(2-trifluoromethylaniline), 4,4'-methylenebis(2-methoxycarbonylaniline), 4,4'-methylenebis(2-ethoxycarbonylaniline), 4,4'-methylenebis(2,3-dichloroaniline), 4,4'-methylenebis (2,5-dichloroaniline); 4,4'-diaminodiphenylmethane such as 4,4'-diamino-3-chloro-3'-bromodiphenylmethane, 4,4'-diamino-3-chlorodiphenylmethane, 4,4'-diamino-2,2',3-trichlorodiphenylmethane; diaminobenzene such as 2,6-dichloro-1,4-diaminobenzene, 4-ethoxy-3,5-diamino-α,α,α-trifluoromethylbenzene, 4-isobutoxy-3,5-diamino-α,α,α-trifluoromethylbenzene, 4-methylthio-3,5-diamino-α,α,α-trifluoromethylbenzene, 4-n-butylthio-3,5-diamino-α,α,α-trifluoromethylbenzene; diaminobenzoate such as methyl 4-chloro-3,5-diaminobenzoate, iso-propyl 4-chloro-3,5-diaminobenzoate, iso-butyl 4-chloro-3,5-diaminobenzoate, iso-butyl 4-ethylthio-3,5-diaminobenzoate; diaminophenyl acetate such as methyl 4-chloro-3,5-diaminophenyl acetate, ethyl 4-chloro-3,5-diaminophenyl acetate, iso-propyl 4-chloro-3,5-diaminophenyl-acetate, butyl 4-chloro-3,5-diaminophenyl acetate; bis(aminobenzoate) such as trimethylenebis(p-aminobenzoate), diethyleneglycolbis(p-aminobenzoate), triethyleneglycolbis(p-aminobenzoate), tetraethyleneglycolbis(p-aminobenzoate); and other aromatic diamines such as 1,2-bis(o-aminophenylthio) ethane, 1,2-bis(p-aminophenylthio)ethane, 3,3'-diamino-4,4'-dichlorodibenzyl ether, 3'-amino-4'-chlorobenzyl 4-aminobenzoate, 3-amino-4-chlorobenzyl 2'-aminophenyl sulfide, hydroquinone bis (o-aminophenylthioethyl)ether, bis 2-(o-aminophenylthio) ethyl terephthalate. The polyamines can be used such as mixtures of 4,4'-methylenebis(2-chloroaniline) and 4,4'-methylenebis(2,3-dichloroaniline) at desired ratios or mixtures obtained in the preparation of the polyamine such as a polyamine mixture obtained by reacting aniline and o-chloroaniline with formaldehyde in the presence of an acid. It is preferable to use a single polyamine compound in order to obtain a polyurethane elastomer having high strength.

The long chain polyols having an average molecular weight of 300 to 4,000 used in the process of the present invention, have terminal hydroxyl groups.

Suitable long chain polyols include

- polyester glycols such as polyethylene adipate, polybutylene adipate and polypropylene adipate;
- polyalkylene ether glycols such as polypropylene ether glycol, tetramethylene ether glycol, polyoxypropylene triol, polyoxypropylene polyoxyethylene triol, polyoxypropylene polyoxyethylene polyoxypropylene triol;
- polyester polyols;
- polybutadiene polyols and polymer polyols. The polyols can be mixtures.

The long chain polyols used in the present invention are usually hygroscopic and water component in the polyol reacts with the isocyanate to form its carbamic acid. The carbamic acid is decomposed at higher than 80° C. to generate carbon dioxide gas. Therefore, a water content in the long chain polyol is preferably reduced to less than 0.02 wt.% in the hot hardening. However, the water content can be about 0.04 wt.% in the cold hardening at lower than 80° C.

The catalyst added to the hardener composition is preferably soluble in the polyol and the polyamine.

Suitable catalysts include tertiary amines such as triethylenediamine, triethylamine, hexamethylenetetramine, N-alkylmorphorine, N-pentamethyldiethylenetriamine, N-hexamethyltriethylenetetramine, N,N-diethylaniline, N,N-dimethylbenzylamine, N,N-dimethyl laurylamine, N,N-dimethyl piperidine, N,N,N',N'-tetramethyl ethylenediamine, N,N.N',N'-tetramethyl -propylenediamine, N,N,N',N'-tetramethyl-1,3-butanediamine, N,N,N',N'-tetramethyl hexamethylenediamine. N,N,N',N',N'-pentamethyl diethylenetriamine, 1,8-diaza-bicyclo-5,4,0-undecene and 1,8-diazabicyclo-5,4,0-undecene methylammonium methosulfate. The tertiary amine can be used together with the other catalyst.

Suitable additional catalysts include Lewis acid catalysts such as organotin compounds such as tetra-n-butyl-tin, tri-n-butyl-tin acetate, n-butyl-tin trichloride, trimethyl-tin hydroxide, dimethyltin dichloride, dibutyl-tin dilaurate, dibuty-tin di-2-ethylhexoate and stannous octoate;

- acetylacetone metal salts such as acetylacetone zinc salt, aluminum salt and cobalt salt;
- metal naphthenates such as zinc naphthenate, lead naphthenate and cobalt naphthenate;
- organomercury compounds such as phenyl mercury acetate, phenyl mercury oleate, mercury octoate and mercury naphthanate;
- organolead compounds such as lead octoate and lead naphthanate;
- alkali metal salts of organic borate esters and organoboron compounds.

In the process of the present invention, it is preferable to combine the Lewis acid with the tertiary amine. Thus, when a polyamine which is reactive with an isocyanate at high reaction velocity such as diaminodiphenyl methane is used, it is effective to use only the Lewis acid as the catalyst.

When the tertiary amine is combined with an organotin compound, it is necessary to take care of the use since it may cause a deterioration acceleration sometimes. The optimum combination is the combination of the tertiary amine with the metal salt of acetylacetone.

The long chain prepolymers having terminal isocyanate groups used in the isocyanate compositions of the present invention can be the prepolymers obtained by the conventional isocyanation of a long chain polyol.

The long chain prepolymer having terminal reactive isocyanate groups and an average molecular weight of 500 to 5,000 can be produced by reacting a long chain polyol having terminal hydroxyl groups and an average molecular weight of 300 to 4,000 such as polyether polyol, polyester polyol, polybutadiene polyol and polymer polyol with excess (to stoichiometric ratio of hydroxyl groups) of an organic diisocyanate monomer such as an aliphatic isocyanate such as tetramethylene 1,4-diisocyanate, and hexamethylene-1,6-diisocyanate; cyclohexane-;b 1,3- or 1,4-diisocyanate; cyclohexylmethane-4,4′-diisocyanate; tolylene-2,4 or 2,6-diisocyanate and mixtures thereof and aromatic diisocyanates such as diphenylmethane-4,4′-diisocyanate and liquid diphenylmethane diisocyanate.

The organic diisocyanate monomers used in the isocyanate composition can be the above-mentioned organic isocyanates in the preparation of the prepolymers and also can be liquid diphenylmethane diisocyanate obtained by modifying diphenylmethane-4,4′-diisocyanate; dimer of 2,4-tolylenediisocyanate, m-phenylenediisocyanate, 3,3′-ditolylene-4,4′-diisocyanate (TODI), 4,4′-biphenyldiisocyanate, dianisidinediisocyanate (DADI), 1,5-naphthalenediisocyanate (NDI).

It is especially preferable to use tolylenediisocyanate and hexamethylenediisocyanate which are liquid at an ambient temperature and liquid diphenylmethanediisocyanate since the viscosity of the prepolymer can be decreased. The organic diisocyanate can be used as mixtures.

It is possible to combine a polyisocyanate having three or more terminal isocyanate groups such as triisocyanate in the isocyanate composition.

In the process of the present invention, the hardener composition can be prepared by dissolving the polyamine into the long chain polyol and adding one or more of the catalyst. The polyamine is preferably added at a ratio of 5 to 60 wt.% to the long chain polyol.

The catalyst is preferably added at a ratio of 0.05 to 3 wt. parts especially 0.05 to 1 wt. part per 100 wt. parts of the mixture of the long chain polyol and the polyamine. When a content of the catalyst is less than 0.05 wt. part, the catalytic effect is not satisfactory. When a content of the catalyst is more than 3 wt. parts, the catalytic effect is not so increased depending upon the increase of the catalyst.

In the process of the present invention, when the isocyanate composition is mixed with the hardener composition, a ratio of the isocyanate groups of the long chain prepolymer in the isocyanate composition to the amino groups of the polyamine in the hardener composition is in a range of 0.6:1 to 1.5:1 preferably 0.9:1 to 1.1:1. When the ratio is less than the minimum range, the mixture is cloudy and a desired polyurethane elastomer can not be obtained. When the ratio is greater than the maximum range, only polyurethane elastomer having inferior physical properties is obtained. A ratio of the isocyanate groups of the diisocyanate monomer to the hydroxyl groups of the long chain polyol in the hardener composition is in a range of 1:1 to 1.4:1 preferably 1.05:1 to 1.25:1. When the ratio of the isocyanate groups of the diisocyanate monomer to the hydroxyl groups is lower than the range, only polyurethane elastomer having inferior physical properties is obtained whereas when the ratio is higher than the range, the polyurethane elastomer may have turbidity and inferior physical properties.

In the process of the present invention, a ratio of a total of the isocyanate groups of the prepolymer and the organic diisocyanate monomer to a sum of the amino groups of the polyamine and the hydroxyl groups of the long chain polyol is in a range of 0.8:1 to 1.4:1 preferably 1.05:1 to 1.25:1. When the ratio is less than the minimum range, only soft plastic resin having no elasticity is obtained. When the ratio is greater than the maximum range, the unreacted isocyanate groups are remained and a hardening is not completed and a desired polyurethane elastomer can not obtained.

In accordance with the process of the present invention, the hardener composition is mixed with the isocyanate composition at a lower temperature usually 10° to 50° C. preferably an ambient temperature and the mixture is poured into a cast mold and is hardened at an ambient temperature to 120° C. for several minutes to several hours by the conventional process and then, it is cured to obtain the polyurethane elastomer.

The temperature in the hardening can be selected depending upon the use of the polyurethane elastomer and the places for the applications. When a fast hardening is required, the hardening is carried out at a higher temperature.

In the process of the present invention, it is necessary to mix the hardener composition with the isocyanate composition at a lower temperature. When they are mixed at high temperature such as 90° to 100° C., the mixture is cloudy.

In the process of the present invention, it is possible to add suitable additives for a polyurethane elastomer such as antioxidants, ultraviolet absorbents, anticoloring agents, antihydrolyzing agents, fungicides, flame-retardants, coloring agents and fillers depending upon the uses of the polyurethane elastomer.

The present invention is to produce a polyurethane elastomer by mixing the hardener composition with the isocyanate composition and to impart the following characteristics and advantages. (1)

The hardener composition and the isocyanate composition are a two liquid system and they can be mixed at an ambient temperature whereby the stable process for production can be expected and a mass production by the automatic continuous mixing method can be easily carried out. (2)

The aromatic diamine such as MOCA which is toxic for hygiene is treated as a solution at an ambient temperature whereby safety is satisfactorily high and a processing environment can be improved. (3)

The components for the polyurethane elastomer can be mixed at an ambient temperature and a satisfactory reaction velocity is given to result in cold hardening at 20° to 60° C. without applying hot hardening at higher than 100° C., whereby large heat energy is not needed to reduce a cost. (4)

The balance of the reaction of the isocyanate to the polyol and the polyamine is well-balanced whereby a polyurethane elastomer having excellent physical properties which are the same or superior to those of the product produced by the hot-melt method using a prepolymer and MOCA as the hardener even though the hot hardening is carried out. The polyurethane elastomer having excellent tensile strength and tear strength which are quite important can be obtained.

The polyurethane elastomers obtained by the process of the present invention can be used as parts for cars, parts for industrial instruments and parts for sport goods and also used as resins for lining of steel tubes. (5) When a catalyst is added in the conventional process, a polyurethane elastomer had inferior heat stability and durability and accordingly, the use of the catalyst is limited. In accordance with the process of the present invention, the catalyst can be selected from various kinds of the catalysts and the hardener can be also selected from various kinds of the hardeners depending upon the applications.

(6) The mixture of the hardener composition and the isocyanate composition has a suitable pot-life (time from the mixing to the gelation which prevents a casting operation), and has a short demold time (time from the pouring of the mixture to the hardening by which the product can be demolded) whereby processability is excellent.

The present invention will be further illustrated by certain examples and references which are provided for purposes of illustration only and are not intended to be limiting the present invention.

The physical properties of the polyurethane elastomers were measured by the methods of Japanese Industrial Standard K-6301.

REFERENCE 1

(1) Preparation of Prepolymer [I]

To 100 g. of polytetramethyleneetherglycol (OH value of 131.5), 39.1 g. of 2,4-tolylenedisocyanate was added to react them at 80° C. for 8 hours. The resulting prepolymer had a content of isocyanate groups of 6.5 wt.% and an average molecular weight of 1293.

(2) Preparation of Prepolymer [II]

To 100 g. of polytetramethyleneetherglycol (OH value of 103), 27.0 g. of 2,4-tolylenediisocyanate to react them at 80° C. for 8 hours. The resulting prepolymer had a content of isocyanate groups of 4.2 wt.% and an average molecular weight of 2000.

(3) Preparation of Prepolymer [III]

To 100 g. of polypropyleneetherglycol (OH value of 100), 29.7 g. of TDI-80 {2,4-tolylenediisocyanate and 2,6-tolylenediisocyanate (80:20)} was added to react them at 80° C. for 8 hours. The resulting prepolymer had a content of isocyanate groups of 4.7 wt.% and an average molecular weight of 1788.

(4) Preparation of Prepolymer [IV]

To 100 g. of polypropyleneetherglycol (OH value of 136.6), 41.1 g of tolylenediisocyanate (TDI-80) was added to react them at 80° C. for 10 hours. The resulting prepolymer had a content of isocyanate groups of 6.8 wt.% and an average molecular weight of 1236.

(5) Preparation of Prepolymer [V]

To 100 g. of polyesterglycol (OH value of 107) obtained by a ring-opening polymerization of ε-caprolactone, 33.1 g. of 2,4-tolylenediisocyanate was added to react them at 80° C. for 10 hours. The resulting prepolymer had a content of isocyanate groups of 6.0 wt.% and an average molecular weight of 1400.

(6) Preparation of Prepolymer [VI]

To 100 g. of polytetramethyleneetherglycol (OH value of 131.5), 56.1 g. of 4,4'-diphenylmethane diisocyanate was added to react them at 60° C. for 4 hours. The resulting prepolymer had a content of isocyanate groups of 5.77 wt.% and an average molecular weight of 1456.

REFERENCE 2

Preparation of sodium tetraalkoxyborate as catalyst

To a solution containing 275 g. of triethyleneglycol and 300 g. of toluene, 29 g. of boron oxide was added. Water produced by the reaction was removed and 11 g. of metallic sodium grain was added to the reaction product and the mixture was heated until all of sodium and toluene was distilled off under a reduced pressure to obtain sodium tetraalkoxyborate having a ratio of Na/B of 4:7.

EXAMPLE 1

(A) Preparation of hardener composition

In a reactor, 100 g. of polytetramethyleneetherglycol (OH value of 103; average molecular weight of 1089) was charged and heated at 100° C. for 2 hours to dehydrate it under a pressure of 2 to 5 mmHg. Then, 41.6 g. of a mixed polyamine of 4,4'-methylenebis(2,3-dichloroaniline) and MOCA at a ratio of 2:8 by weight, and 0.3 g. of triethylenediamine catalyst were added to the dehydrated product to mix them to dissolve them completely.

(B) Preparation of Isocyanate Composition

A mixture of 193 g. of the prepolymer[I] prepared in Reference 1 and 19 g. of TDI-80 was thoroughly mixed and degasified at an ambient temperature under a pressure of 20 to 30 mmHg.

(C) Preparation of Polyurethane Elastomer

In a reactor, 140.2 g. of the hardener composition prepared in the process (A) was charged and 212 g. of the isocyanate composition prepared by the process (B) was added and the mixture was thoroughly mixed at an ambient temperature and was poured into a cast mold which was preheated at 60° C. so as to harden it for 30 minutes. The product was cured in a forced air-flow oven at 60° C. for 15 hours to obtain a polyurethane elastomer.

A ratio of isocyanate groups of the prepolymer in the isocyanate composition to amino groups of the polyamine in the hardener composition $$\left(\text{hereinafter referring to as } R_1 \frac{NCO}{NH_2}\right)$$

was 1:1. A ratio of isocyanate groups of the organic diisocyanate (TDI-80) in the isocyanate composition to hydroxyl groups of the polyol in the hardener composition $$\left(\text{hereinafter referring to as } R_2 \frac{NCO}{OH}\right)$$

was 1.19:1. A ratio of total isocyanate groups in the isocyanate composition to a sum of amino groups of the polyamine and hydroxyl groups of the polyol in the hardener composition $$\left(\text{hereinafter referring to as } R_3 \frac{NCO}{NH_2 + OH}\right)$$

was 1.07:1.

The physical properties of the resulting polyurethane elastomer are shown in Table 1.

The results show the fact that the polyurethane elastomer obtained by the process of the present invention had excellent physical properties especially excellent tensile strength and tear strength.

COMPARATIVE EXAMPLE 1

In accordance with the process of Example 1 except using 334 g. of the prepolymer[I] instead of 212 g. of the isocyanate composition $$\left(R_2\,\frac{NCO}{NH_2 + OH} = 1.07{:}1\right),$$

a polyurethane elastomer was prepared.

The physical properties of the resulting polyurethane elastomer are shown in Table 1 together with the composition.

The results show that the polyurethane elastomer having inferior modulus and tensile strength was obtained by the cold mixing-cold hardening method using only the prepolymer.

COMPARATIVE EXAMPLE 2

In accordance with the process of Example 1 except using 44.9 g. of TDI-80 instead of 212 g. of the isocyanate composition $$\left(R_3\,\frac{NCO}{NH_2 + OH} = 1.07\right),$$

a preparation of a polyurethane elastomer was carried out. Thus, only a white clay-like substance was obtained. The results are shown in Table 1 together with the composition.

COMPARATIVE EXAMPLE 3

In accordance with the process of Example 1 except using 106.2 g. of the prepolymer[I] and 30.6 g. of TDI-80 instead of 212 g. of the isocyanate composition $$\left(R_1\,\frac{NCO}{NH_2} = 0.55{:}1;\ R_3\,\frac{NCO}{NH_2 + OH} = 1.07{:}1\right),$$

a polyurethane elastomer was produced.

The physical properties of the resulting polyurethane elastomer are shown in Table 1 together with the composition.

The results show the fact that the polyurethane elastomer had inferior modulus, tensile strength and tear strength than those of Example 1 in the same hardness.

COMPARATIVE EXAMPLE 4

In accordance with the process of Example 1 except eliminating the catalyst from the hardener composition, a polyurethane elastomer was produced.

The physical properties of the resulting polyurethane elastomer are shown in Table 1 together with the composition.

The results show the fact that the polyurethane elastomer had inferior modulus, tensile strength and tear strength than those of Example 1 in the same hardness.

COMPARATIVE EXAMPLE 5

In this case, 100 g. of the prepolymer[II] prepared in Reference 1 was heated at 100° C. and deareated under a pressure of 20 mmHg and 13.2 g. of the mixed polyamine use in the preparation of the hardener composition of Example 1 was melted and added. The mixture was throughly mixed and poured into a cast mold preheated at 100° C. to harden for 30 minutes. The product was cured in a forced air-flow oven at 100° C. for 15 hours.

The physical properties of the resulting polyurethane elastomer are shown in Table 1 together with the composition.

In this case, in order to give a hardness of about 90, it was obliged to use the prepolymer[II] instead of the prepolymer[I]. In spite of this fact, the polyurethane elastomer had inferior tensile strength, elongation and tear strength than those of Example 1.

TABLE 1

| Example or | Exp. | Comp. Example | | | | |
|---|---|---|---|---|---|---|
| Comp. Example | 1 | 1 | 2 | 3 | 4 | 5 |
| Hardner composition: | | | | | | |
| PTMG-1000 (g) | 100 | 100 | 100 | 100 | 100 | — |
| Mixed polyamine (g) | 41.6 | 41.6 | 41.6 | 41.6 | 41.6 | 13.2 |
| Triethylenediamine (g) | 0.3 | 0.3 | 0.3 | 0.3 | — | — |
| Isocyanate composition: | | | | | | |
| Prepolymer [I] (g) | 193 | 334 | — | 106.2 | 193 | — |
| Prepolymer [II] (g) | — | — | — | — | — | 100 |
| TDI-80 | 19 | — | 44.9 | 30.6 | 19 | — |
| Ratios: | | | | | | |
| $R_2$ NCO/OH | 1.19 | — | 2.81 | 1.91 | 1.19 | — |
| $R_1$ NCO/$NH_2$ | 1.0 | 1.73 | — | 0.55 | 1.0 | 1.05 |
| $R_3$ NCO/$NH_2$ + OH | 1.07 | 1.07 | 1.07 | 1.07 | 1.07 | 1.05 |
| Physical property: | | | | | | |
| Hardness (Shore A) | 91 | 90 | white | 90 | 93 | 92 |
| Modulus 100% (kg./$cm^2$) | 78 | 48 | clay- | 51 | 60 | 84 |
| Modulus 300% (kg./$cm^2$) | 147 | 77 | like | 51 | 81 | 151 |
| Tensile strength (kg./$cm^2$) | 588 | 214 | sub- | 51 | 115 | 365 |
| Elongation (%) | 510 | 565 | stance | 400 | 487 | 430 |
| Tear strength (kg./cm) | 113 | 70 | | 46 | 50 | 89 |

EXAMPLES 2 to 7

(A) Preparation of Hardener Composition

In accordance with the process of Example 1 except using 100 g. of polypropyleneglycol (OH value of 110; average molecular weight of 1020) and each specific amount of the polyamine shown in Table 2 and 0.12 g. of dibutyl-tin-laurate, hardener compositions were prepared.

(B) Preparation of Isocyanate Composition

In accordance with the process of Example 1 except using 184.6 g. of the prepolymer [IV] and 20.3 g. of TDI-80, isocyanate compositions were prepared.

(C) Preparation of Polyurethane Elastomer

In accordance with the process of Example 1, the total amount of said hardener composition (A) was admixed with the total amount (204.9 g.) of said isocyanate composition (B) at an ambient temperature to prepare polyurethane elastomers were prepared. ($R_1$ NCO/$NH_2$=1:1; $R_2$ NCO/OH=1.19:1 and $R_3$ NCO/$NH_2$+OH=1.07:1).

The physical properties of the resulting polyurethane elastomers are shown in Table 2.

The results show the fact that the polyurethane elastomers having physical properties which are the same or greater physical properties of the product obtained in Comparative Example 6 as the conventional prepolymer method, can be obtained by the process of the present invention.

According to the results of Examples 2 to 7, the usual polyamines can be used without using MOCA which is the special one for producing a polyurethane elastomer having the optimum physical properties.

COMPARATIVE EXAMPLE 6

In accordance with the process of Comparative Example 5 except using 100 g. of the prepolymer [IV] prepared in Reference 1 and 14.2 g. of MOCA, a polyurethane elastomer was prepared.

The physical properties of the resulting polyurethane elastomer are shown in Table 2.

According to this prepolymer method, the product was similar to the product having a hardness of 90 (Shore A) obtained by using the conventional polypropyleneglycol type prepolymer.

4,4'-methylenebis(2-methoxycarbonylaniline) and each specific amount of each catalyst shown in Table 3, instead of the hardener composition of Example 1, hardener compositions were prepared.

On the other hand, 220.7 g. of an isocyanate composition was prepared by mixing 200.9 g. of the prepolymer [V] prepared in Reference 1 and 19.8 g. of TDI-80 by the process set forth in Example 1.

In accordance with the process of Example 1 except using 220.7 g. of the isocyanate composition and 147.2 g. of the hardener composition, polyurethane elastomers were prepared. ($R_1$ RCO/$NH_2$ of 1:1; $R_2$ NCO/OH of 1.19:1; $R_3$ NCO/$NH_2$+OH of 1.07:1).

The physical properties of the resulting polyurethane elastomers are shown in Table 3.

The results of Table 3 show the fact that the conventional catalysts can be used for the preparation of the polyurethane elastomer of the present invention.

TABLE 2

| Example and Comp. Example | Example 2 | 3 | 4 | 5 | 6 | 7 | Comp. Exp. 6 |
|---|---|---|---|---|---|---|---|
| Polyamine: | | | | | | | |
| 2,6-Dichloro-1,4-diaminobenzene (g) | 26.4 | | | | | | |
| 4-4'-Methylenebis(2-chloroaniline) (g) | | 39.9 | | | | | 14.2 |
| 4,4'-Methylenebis(2-methoxycarbonylaniline) (g) | | | 46.9 | | | | |
| 4,4'-Methylenebis(2,3-dichloroaniline) (g) | | | | 50.2 | | | |
| 1,2-Bis(o-aminophenylthio) ethane (g) | | | | | 41.2 | | |
| Trimethyleneglycolbis(p-aminobenzoate) (g) | | | | | | 46.9 | |
| Processability: | | | | | | | |
| Pot-life (min.) | 4 | 6 | 6 | 10 | 11 | 13 | 10 |
| Demold time (min.) | 56 | 25 | 35 | 62 | 70 | 85 | 40 |
| Physical property: | | | | | | | |
| Hardness (Shore A) | 92 | 91 | 90 | 92 | 88 | 86 | 90 |
| Modulus 100% (kg./cm$^2$) | 71 | 68 | 65 | 71 | 53 | 46 | 60 |
| Modulus 300% (kg./cm$^2$) | 108 | 115 | 110 | 125 | 98 | 85 | 105 |
| Tensile strength (kg./cm$^2$) | 289 | 310 | 321 | 304 | 285 | 265 | 251 |
| Elongation (%) | 540 | 550 | 497 | 512 | 506 | 532 | 573 |
| Tear strength (kg./cm) | 71 | 75 | 69 | 72 | 68 | 66 | 68 |

EXAMPLES 8 TO 15

In accordance with the process of Example 1 except using 100 g. of polyester glycol (OH value of 107: average molecular weight of 1049) obtained by a ring-opening polymerization of $\epsilon$-caprolactone, and 47.2 g. of The results of Examples 8, 13, 14, and 15 show the fact that polyurethane elastomers having superior physical properties can be obtained by using the tertiary amine itself or the combination of the tertiary amine and the organometallic compound.

TABLE 3

| Example | 8 | 9 | 10 | 11 | 12 | 13 | 14 | 15 |
|---|---|---|---|---|---|---|---|---|
| Catalyst: | | | | | | | | |
| Triethylenediamine (g) | 0.5 | | | 0.35 | 0.35 | 0.35 | 0.35 | 0.35 |
| Lead naphthenate (15% Pb) (g) | | | | 0.5 | | | | |
| Dibutyl-tin-laurate (g) | | 0.5 | | | 0.07 | | | |
| Acetylacetone zinc salt (g) | | | | | | 0.2 | | |
| Acetylacetone aluminum salt (g) | | | | | | | 0.3 | |
| *** | | | | | | | | |
| Sodium tetraalkoxyborate (g) | | | 0.7 | | | | | 0.5 |
| Processability: | | | | | | | | |
| Pot-life (min.) | 4 | 8 | 14 | 7 | 4 | 5 | 6 | 7 |
| Demold time (min.) | 40 | 70 | 105 | 60 | 35 | 45 | 45 | 63 |
| Physical property: | | | | | | | | |
| Hardness (Shore A) | 91 | 89 | 90 | 91 | 91 | 92 | 92 | 91 |
| Modulus 100% (kg./cm$^2$) | 56 | 51 | 51 | 53 | 56 | 58 | 57 | 54 |
| Modulus 300% (kg./cm$^2$) | 135 | 130 | 106 | 131 | 132 | 142 | 140 | 126 |
| Tensile strength (kg./cm$^2$) | 455 | 395 | 256 | 468 | 510 | 528 | 523 | 425 |
| Elongation (kg./cm$^2$) | 560 | 593 | 503 | 570 | 540 | 565 | 555 | 532 |

TABLE 3-continued

| Example | 8 | 9 | 10 | 11 | 12 | 13 | 14 | 15 |
|---|---|---|---|---|---|---|---|---|
| Tear strength (kg./cm) | 117 | 108 | 95 | 113 | 121 | 119 | 116 | 107 |

Note:
*** This is obtained in Reference 2.

EXAMPLES 16 TO 18

In accordance with the process of Example 1 except using 100 g. of polytetramethyleneglycol (OH value of 103.0; average value of 1089), 39.9 g. of MOCA, 0.35 g. of triethylenediamine and 0.2 g. of acetylacetone zinc salt, a hardener composition was prepared.

In accordance with the process of Example 1 except using 193 g. of the prepolymer [I] of Reference 1 and 19.0 g. of TDI-80, an isocyanate composition was prepared.

The hardener composition and the isocyanate composition were mixed at an ambient temperature and the mixture was hardened at 25° C., 63° C., or 100° C. as shown in Table 4 and then, cured in the specific conditions shown in Table 4 to obtain polyurethane elastomers. ($R_1$ $NCO/NH_2$ of 1:1; $R_2$ $NCO/OH$ of 1.19:1; $R_3$ $NCO/NH_2+OH$ of 1.07:1).

The physical properties of the resulting polyurethane elastomers are shown in Table 4 together with the results of the processability in the preparations.

EXAMPLES 19 TO 21

In accordance with the process of Example 1, 140.5 g. of the hardener composition used in Examples 16 to 18 was admixed with 220.3 g. of an isocyanate composition obtained by using 193 g. of the prepolymer [I] of Reference 1 and 27.3 g. of 4,4'-diphenylmethanediisocyanate (MDI) and the mixture was hardened at 25° C., 63° C., or 100° C. as shown in Table 4 and then, cured in the specific conditions shown in Table 4 to obtain polyurethane elastomers. ($R_1$ $NCO/NH_2$; $R_2$ $NCO/OH$ and $R_3$ $NCO/NH_2+OH$ are respectively the same as those of Examples 16 to 18).

The physical properties of the resulting polyurethane elastomers are shown in Table 4 together with the results of the processability in the preparations.

COMPARATIVE EXAMPLE 7

In accordance with the process of Comparative Example 5 except using 100 g. of the prepolymer [II] of Reference 1 and 12.6 g. of MOCA, a polyurethane elastomer was prepared.

The physical properties of the polyurethane elastomer obtained by the prepolymer method are shown in Table 4 together with the results of the processability of the preparations.

TABLE 4

| Example and Comp. Example | Example 16 | 17 | 18 | 19 | 20 | 21 | Comp. Exp. 7 |
|---|---|---|---|---|---|---|---|
| Isocyanate composition | Prepolymer [I]TDI-80 | | | Prepolymer [I] MDI | | | — |
| Casting condition: | | | | | | | |
| Temperature in mixing (°C.) | 20 | 20 | 20 | 20 | 20 | 20 | 100 |
| Temperature in hardening (°C.) | 100 | 63 | 25 | 100 | 63 | 25 | 100 |
| Curing (°C.) × (hr) | 60 × 5 | 60 × 5 | 25 × 24 | 60 × 5 | 60 × 5 | 25 × 24 | 100 × 5 |
| Processability: | | | | | | | |
| Pot-life (min.) | 7 | 7 | 7 | 4.5 | 4.5 | 4.5 | 12 |
| Demold time (min.) | 13 | 28 | 180 | 10 | 20 | 150 | 40 |
| Physical property: | | | | | | | |
| Hardness (Shore A) | 91 | 92 | 85 | 91 | 92 | 86 | 92 |
| Modulus 100% (kg./cm$^2$) | 78 | 77 | 65 | 69 | 70 | 63 | 84 |
| Modulus 300% (kg./cm$^2$) | 147 | 142 | 135 | 145 | 158 | 132 | 152 |
| Tensile strength (kg./cm$^2$) | 588 | 563 | 451 | 571 | 558 | 433 | 365 |
| Elongation (%) | 510 | 510 | 480 | 456 | 460 | 442 | 460 |
| Tear strength (kg./cm) | 110 | 113 | 85 | 96 | 98 | 81 | 86 |

The results of Table 4 show the fact that the hardener composition and the isocyanate composition can be mixed and poured into a cast mold at an ambient temperature and the polyurethane elastomer having the properties being substantially the same as those of the product cured at about 100° C. in the conventional prepolymer method (Comparative Example 7) can be obtained by the curing at about 25° C. (Examples 18 and 21), the polyurethane elastomer having the tensile strength superior to the product obtained by curing at 100° C. in the conventional prepolymer method and the modulus. The elongation and the tear strength which are the same or superior to those of said product can be obtained by the curing at higher than 63° C. (Examples 16, 17, 19 and 20).

In accordance with the process of the present invention, suitable pot-life for the casting of the polyurethane elastomer is given and the curing can be carried out in a wide temperature range from low temperature to high temperature and the demold time can be shortened by curing at a desired elevated temperature.

EXAMPLES 22 TO 24

Each hardener composition was prepared by blending 100 wt. parts of polytetramethyleneetherglycol (OH value of 103; average molecular weight of 1089), 47.0 wt. parts of 4,4'-methylenebis(2-methoxycarbonylaniline) and the specific amount of the catalyst shown in Table 5 and 2 kg. of the hardener composition was charged in a tank for resin in an automatic casting machine (Junior Spenser manufactured by Nippon Chemix K. K.) and was recycled at the ambient temperature.

On the other hand, an isocyanate composition was prepared by blending 217 wt. parts of the prepolymer [VI] prepared in Reference 1 to 27.3 wt. parts of 4,4'-diphenylmethanediisocyanate and 3.3 kg. of the isocyanate composition was charged in a tank for an isocyanate composition and was recycled at the ambient temperature. ($R_1$ $NCO/NH_2$ of 1:1; $R_2$ NCO/OH of 1.19:1).

The hardener composition and the isocyanate composition were mixed at a ratio of 0.6:1 by weight at the ambient temperature and the mixture was poured into a cast mold preheated at 60° C. to harden it. The product was demolded and cured in a forced air-flow oven at 60° C. for 2 hours to obtain a polyurethane elastomer. The polyurethane elastomer was heated at 100° C. for 3 weeks and the physical properties of the product each week were measured to test heat-resistance.

The results of the processability and the heat resistance of the polyurethane elastomers are shown in Table 5.

COMPARATIVE EXAMPLE 8

Into the tank for resin of the automatic casting machine used in Examples 22 to 24, 1 kg. of MOCA was charged, heat-melted and recycled at 110° C.

On the other hand, into the tank for isocyanate, 2 kg. of the prepolymer [VI] prepared in Reference 1 was charged and recycled at the ambient temperature.

The hardener composition and the prepolymer [VI] as the isocyanate composition were mixed at a ratio of 0.174:1 by weight ($R_1$ $NCO/NH_2$ of 1.05:1) and the mixture was poured into a cast mold preheated at 100° C. to harden it for 20 minutes. The product was demolded and cured in a forced air-flow oven at 100° C. for 10 hours to obtain a polyurethane elastomer. The heat resistances of the polyurethane elastomers were tested as set forth in Examples 22 to 24. The results are shown in Table 5.

The results of Table 5 show the fact that the polyurethane elastomer obtained by the process of the present invention maintains high tensile strength than that of the product in the conventional prepolymer method (Comparative Example 8) and accordingly, they had excellent heat resistance.

TABLE 5

| Example and Comp. Example | Example 22 | Example 23 | Example 24 | Comp. Exp. 8 |
|---|---|---|---|---|
| Catalyst: *** | | | | |
| Triethylenediamine (g) | 0.45 | 0.35 | 0.4 | — |
| Zn—Acetylacetone (g) | — | 0.15 | — | — |
| Al—Acetylacetone (g) | — | — | 0.3 | — |
| Processability: | | | | |
| Pot-life (min.) | 2 | 3 | 3 | 12 |
| Demold time (min.) | 8 | 10 | 10 | 20 |
| Heat resistance: | | | | |
| Tensile strength (kg./cm$^2$) | | | | |
| heated for 0 | 526 | 488 | 556 | 435 |
| heated for 1 week | 563 | 536 | 545 | 482 |
| heated for 2 weeks | 511 | 503 | 518 | 413 |
| heated for 3 weeks | 463 | 478 | 469 | 401 |

Note:
*** The amount of each catalyst to 100 g. of the hardener composition.

We claim:

1. In a process for producing a polyurethane elastomer by mixing (a) a hardener composition containing a polyamine, a long chain polyol having an average molecular weight of 300 to 4,000 and a catalyst with (b) an isocyanate composition, an improvement characterized in that said isocyanate composition comprises a prepolymer having terminal isocyanate group and an average molecular weight of 500 to 5,000 and an organic diisocyanate monomer with or without a triisocyanate monomer and a ratio of isocyanate groups of said prepolymer to amino groups of said polyamine is in a range of 0.6:1 to 1.5:1 and a ratio of a total of isocyanate groups in said isocyanate composition to a sum of amino groups of said polyamine and hydroxyl group of said long chain polyol is in a range of 0.8:1 to 1.4:1.

2. A process according to claim 1 wherein said prepolymer is dissolved into said organic diisocyanate monomer without a substantial amount of a solvent to form said isocyanate composition.

3. A process according to claim 2 wherein a homogeneous mixture of said prepolymer and said organic diisocyanate monomer is brought into contact with said hardener composition to form a flowable mixture.

4. A process according to claim 1 wherein said organic diisocyanate monomer functions to lower the viscosity of said prepolymer at the mixing step and to react with said hardener after pouring into a mold so as to initiate hardening at an ambient temperature without causing excessive curing.

5. The process of claim 1, wherein said hardener composition and said isocyanate composition are mixed at ambient temperature, then poured into a cast mold and hardened at ambient temperature to about 100° C., and finally cured to obtain the polyurethane elastomer.

6. The process of claim 1, wherein said catalyst is selected from the group consisting of a tertiary amine, a Lewis acid catalyst and a mixture thereof.

7. The process of claim 1, wherein said polyamine is a mixture of 4,4'-methylenebis(2,3-dichloraniline) and 4,4'-methylenebis(2-chloroaniline), said polyol is polytetramethyleneetherglycol, said catalyst is triethylene diamine, said prepolymer is the reaction product of polytetramethylenetherglycol and tolylenediisocyanate and said organic diisocyanate monomer is tolylene diisocyanate.

8. The process of claim 1, wherein said polyamine is a member selected from the group consisting of 2,6-dichloro-1,4 diaminobenzene, 4,4'-methylenebis(2-chloraniline), 4,4'-methylenebis(2-methoxycarbonylaniline), 4,4'-methylenebis(2,3-dichloroaniline), 1,2-bis(o-aminophenylthio) ethane and trimethyleneglycolbis(p-aminobenzoate), said polyol is polyproylene glycol, said catalyst is dibutyl-tin-laurate, said prepolymer is the reaction product of polypropylenethergylcol and tolylenediisocyanate, and said organic diisocyanate monomer is tolylene diisocyanate.

9. The product of the process of claim 1.

* * * * *